(12) United States Patent
Tsai

(10) Patent No.: US 6,572,071 B1
(45) Date of Patent: Jun. 3, 2003

(54) SHOCK ELIMINATOR

(76) Inventor: Chung-Shien Tsai, Fl. 3, No. 9, Alley 10, Lane 86, Sec. 2, Nan Kang Rd., Taipei (TW)

( * ) Notice: Subject to any disclaimer, the term of this patent is extended or adjusted under 35 U.S.C. 154(b) by 119 days.

(21) Appl. No.: 09/987,786

(22) Filed: Nov. 16, 2001

(51) Int. Cl.[7] .............................................. F16M 13/00
(52) U.S. Cl. ..................................... 248/618; 248/566
(58) Field of Search ................................ 248/618, 564, 248/565, 566, 570, 577, 635, 634, 638, 674, 678, 677; 52/167.6, 167.7, 167.8, 167.1

(56) References Cited

U.S. PATENT DOCUMENTS

| | | | | |
|---|---|---|---|---|
| 4,496,130 A | * | 1/1985 | Toyama | 188/380 |
| 4,713,917 A | * | 12/1987 | Buckle et al. | 248/565 |
| 4,883,250 A | * | 11/1989 | Yano et al. | 188/267 |
| 5,303,524 A | * | 4/1994 | Caspe | 248/636 |
| 5,769,381 A | * | 6/1998 | Patin | 248/618 |
| 6,273,224 B1 | * | 8/2001 | Achmad | 188/266.5 |
| 6,343,676 B1 | * | 2/2002 | Achmad | 188/266.5 |
| 2002/0093637 A1 | * | 7/2002 | Yuan et al. | 355/72 |

* cited by examiner

Primary Examiner—Anita King
Assistant Examiner—A. Joseph Wujciak
(74) Attorney, Agent, or Firm—Rosenberg, Klein & Lee

(57) ABSTRACT

This invention provides an improved shock eliminator, particularly a shock eliminator for use in constructions such as bridges and houses. The shock eliminator includes a base, a carrier seat, a slide block and springs. The top side of the base is provided with a round curved concave slide recess. The slide block has a bottom surface formed with a curved surface equivalent to the slide recess in diameter and disposed in the slide recess, and a top side centrally provided with a hemispherical depressed coupling groove. The carrier seat is a plate member disposed on the top portion of the slide block and has a bottom portion centrally provided with a coupling post having a hemispherical distal end equivalent to the depressed surface of the coupling groove in diameter. The coupling post is disposed in the coupling groove of the slide block. A suitable number of springs are disposed on the surface of the slide block around the coupling groove to hook the bottom side of the carrier seat. The shock eliminator is installed at the bottom of a column of a building or bridge to ensure shock eliminating effect and safety of the building and bridge.

17 Claims, 6 Drawing Sheets

SHOCK ELIMINATOR

BACKGROUND OF THE INVENTION (a) Field of the Invention

The invention relates to an improved shock eliminator, more particularly to a shock eliminator for use in constructions such as bridges and houses and having the dual mechanisms of sliding and swinging to thereby enhance shock eliminating effect and safety of constructions.

(b) Description of the Prior Art

Shock eliminators for building constructions can be divided into pseudo-spring type and sliding type according to mechanical properties. Manufactures have developed a kind of friction pendulum supporting type shock eliminating device, which combines the features of the pseudo-spring and sliding types. Relevant studies first appeared in a report by the earthquake engineering research center of U.C. Berkeley, V. Zagas, S. S. Low and S. A. Mahin, 1987. The inventor of this invention also published relevant studies in the U.S.A. and Taiwan, C. S. Tsai, 1995; C. S. Tsai 1997; C. S. Tsai, Chi-Jen Huang, 1998. The inventor has good knowledge of the principles of the shock eliminators, and are well aware of the drawbacks associated with conventional shock eliminators, which are set forth below:

1. As the construction of the friction pendulum supporting type shock eliminating device is not properly designed, the components are disposed to lie one above the other without any interconnection and are therefore independent. During an earthquake, if there is an elevating force (which often occurs at the side columns of a building), the components of the shock eliminator will become detached and fail to provide the shock eliminating function, which may result in damage to the building.
2. Due to improper design, the conventional friction pendulum supporting type shock eliminating device easily accumulate dust after prolonged use, which affects the sliding mechanism and may eventually cause the shock eliminating device to lose its function.
3. The conventional friction pendulum supporting type shock eliminating device is complicated and time-consuming to manufacture, which is not economical.

SUMMARY OF THE INVENTION

The object of the invention is to provide an improved shock eliminator to overcome the problems of the prior art.

It is the primary object of the present invention to provide an improved shock eliminator for use in constructions such as bridges and houses and having the dual mechanisms of sliding and swinging to thereby enhance shock eliminating effect and safety of constructions.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
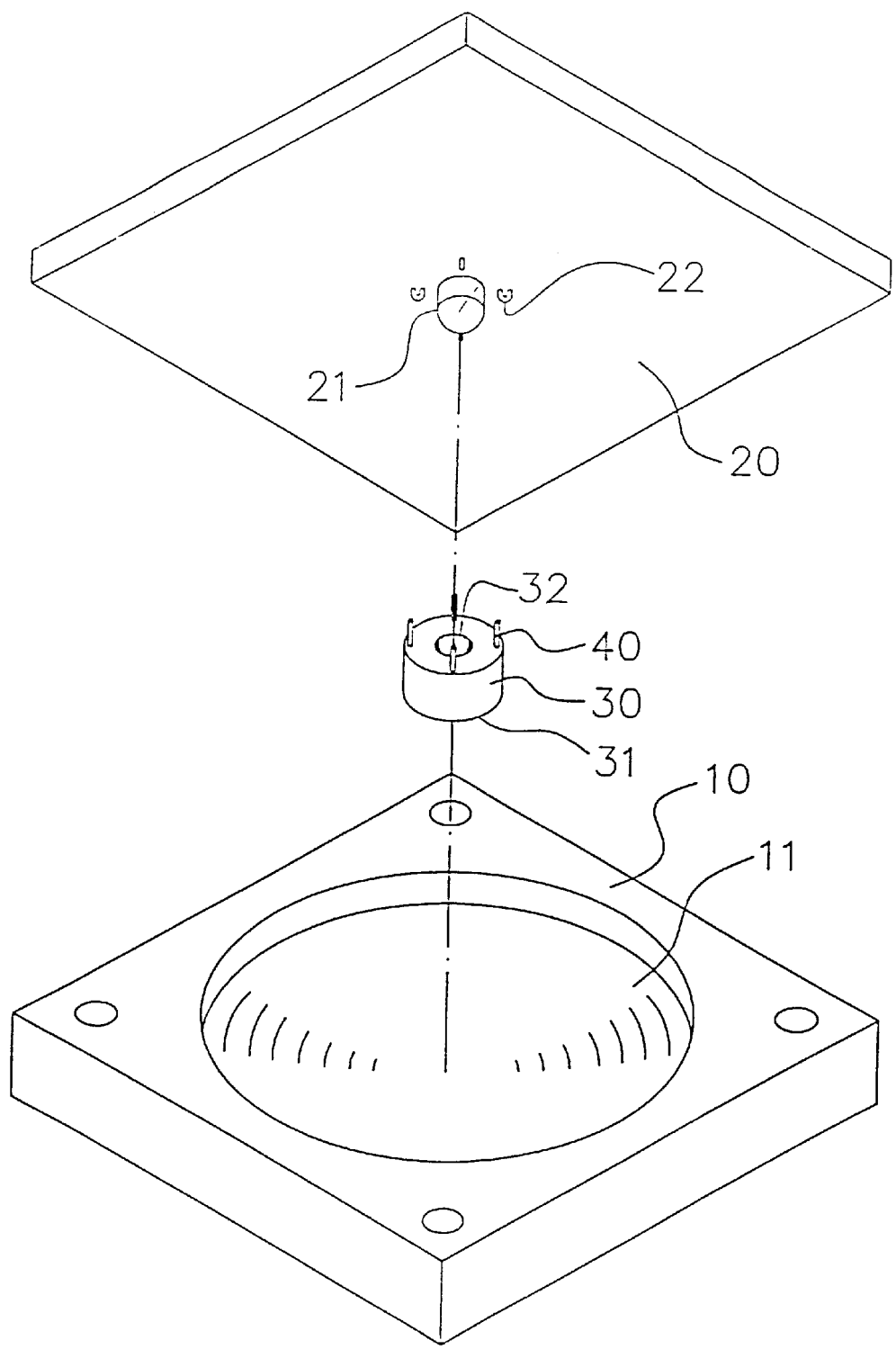
FIG. 1 is an exploded perspective view of the invention.
Figure 2:
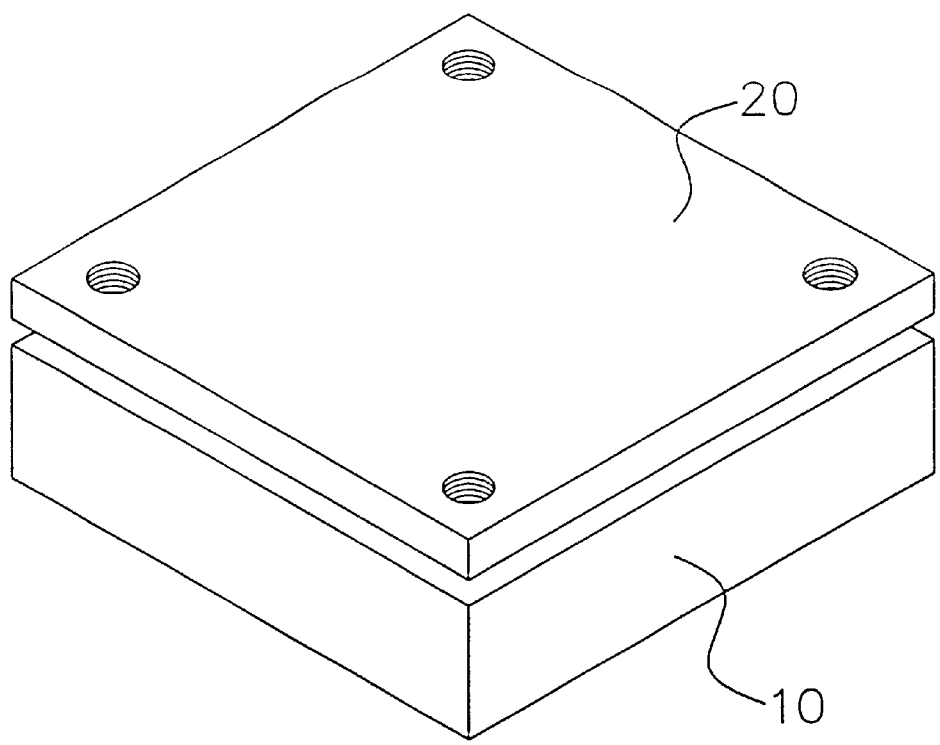
FIG. 2 is a perspective view of the invention in an assembled state.
Figure 3:
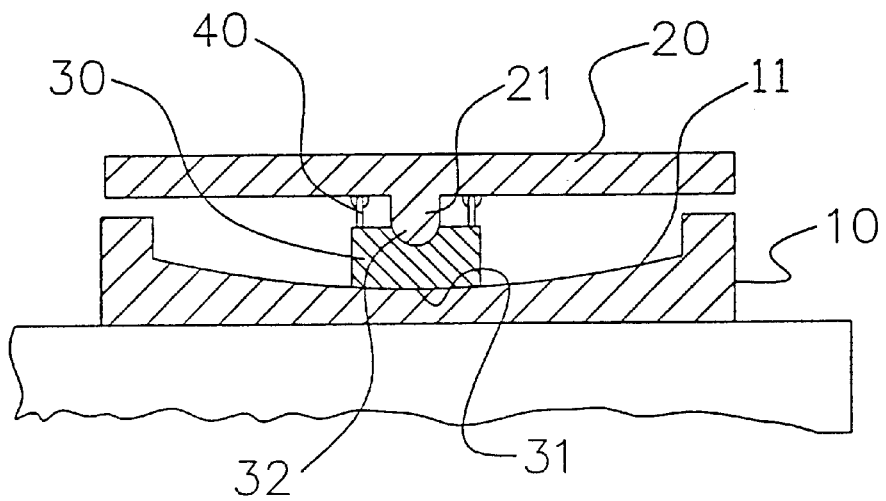
FIG. 3 is a sectional view of the invention in the assembled state.
Figure 4:
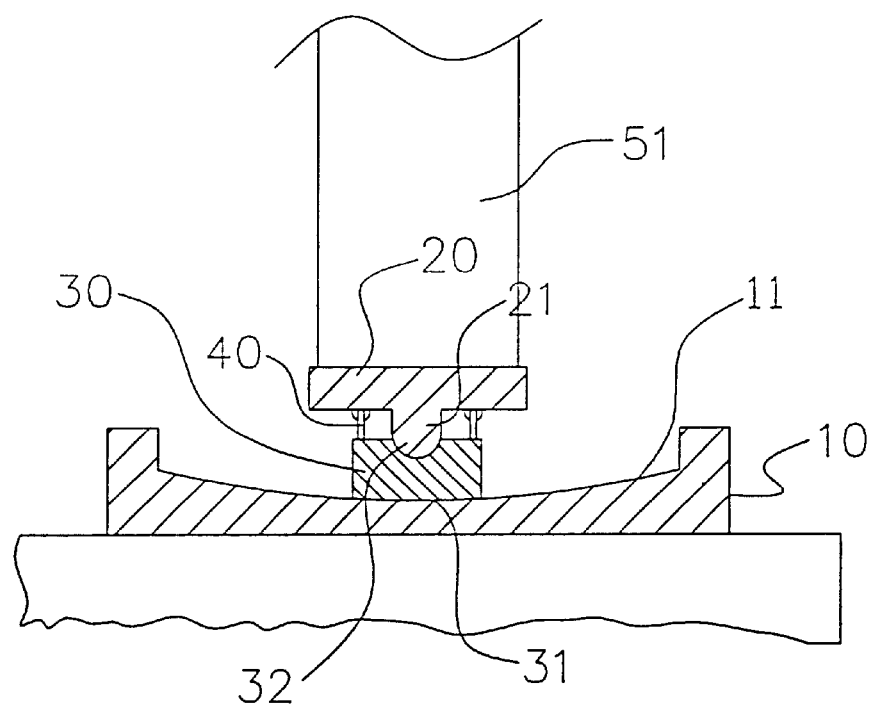
FIG. 4 is a schematic view showing how the invention is installed on a building.
Figure 5:
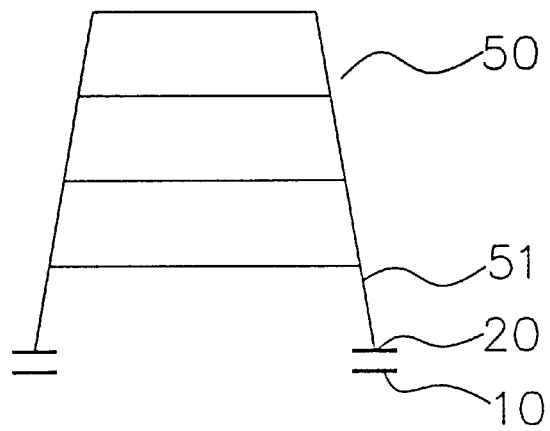
FIGS. 5 to 7 illustrate the invention in use.
Figure 6:
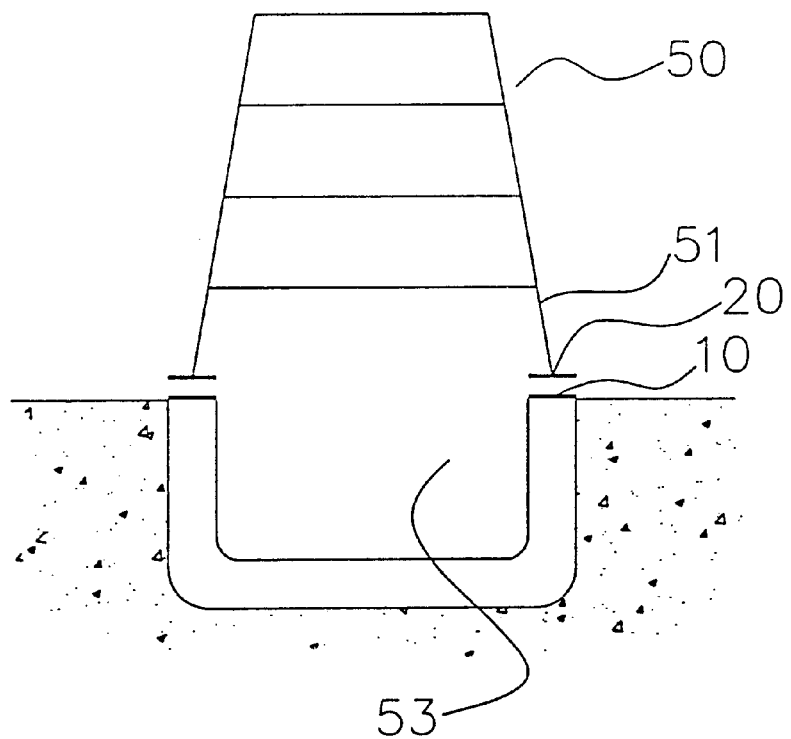
Figure 7:
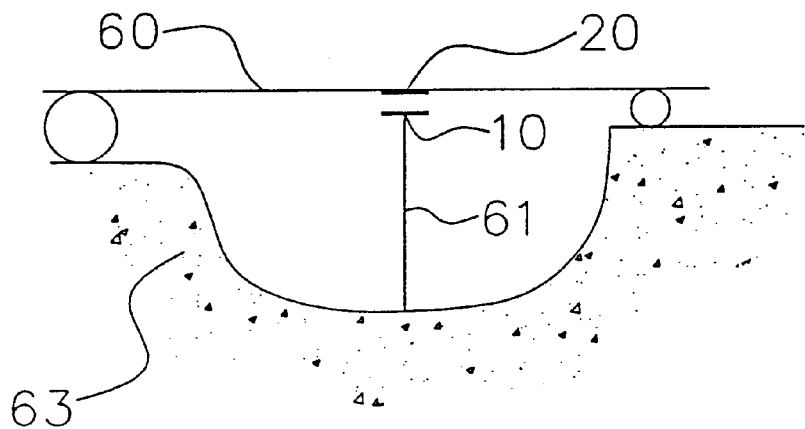

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 8:
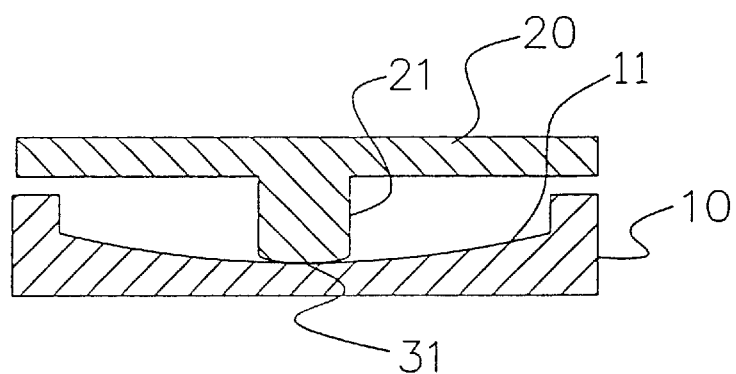
FIG. 8 is a sectional view of another assembly according to the invention.
Figure 9:
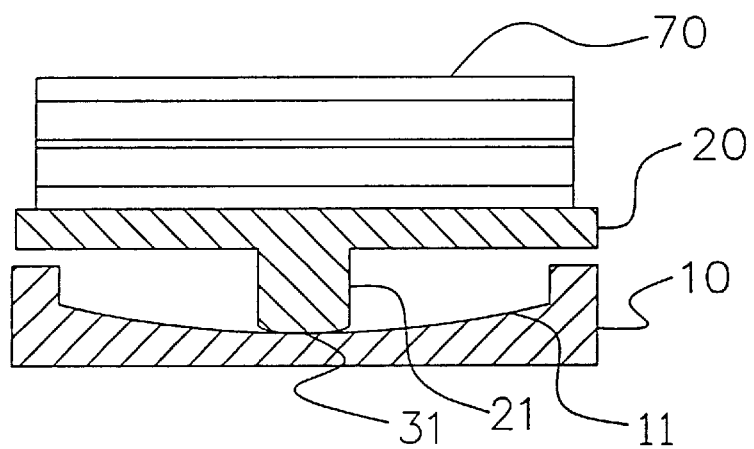
FIGS. 9 and 10 are sectional views of still another assembly according to the invention.
Figure 10:
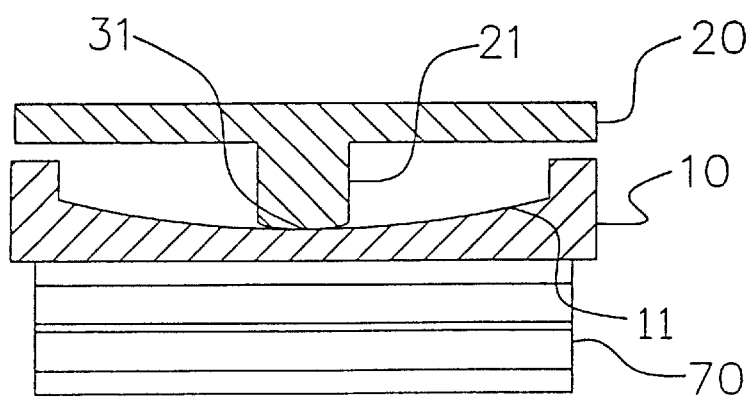
Figure 11:
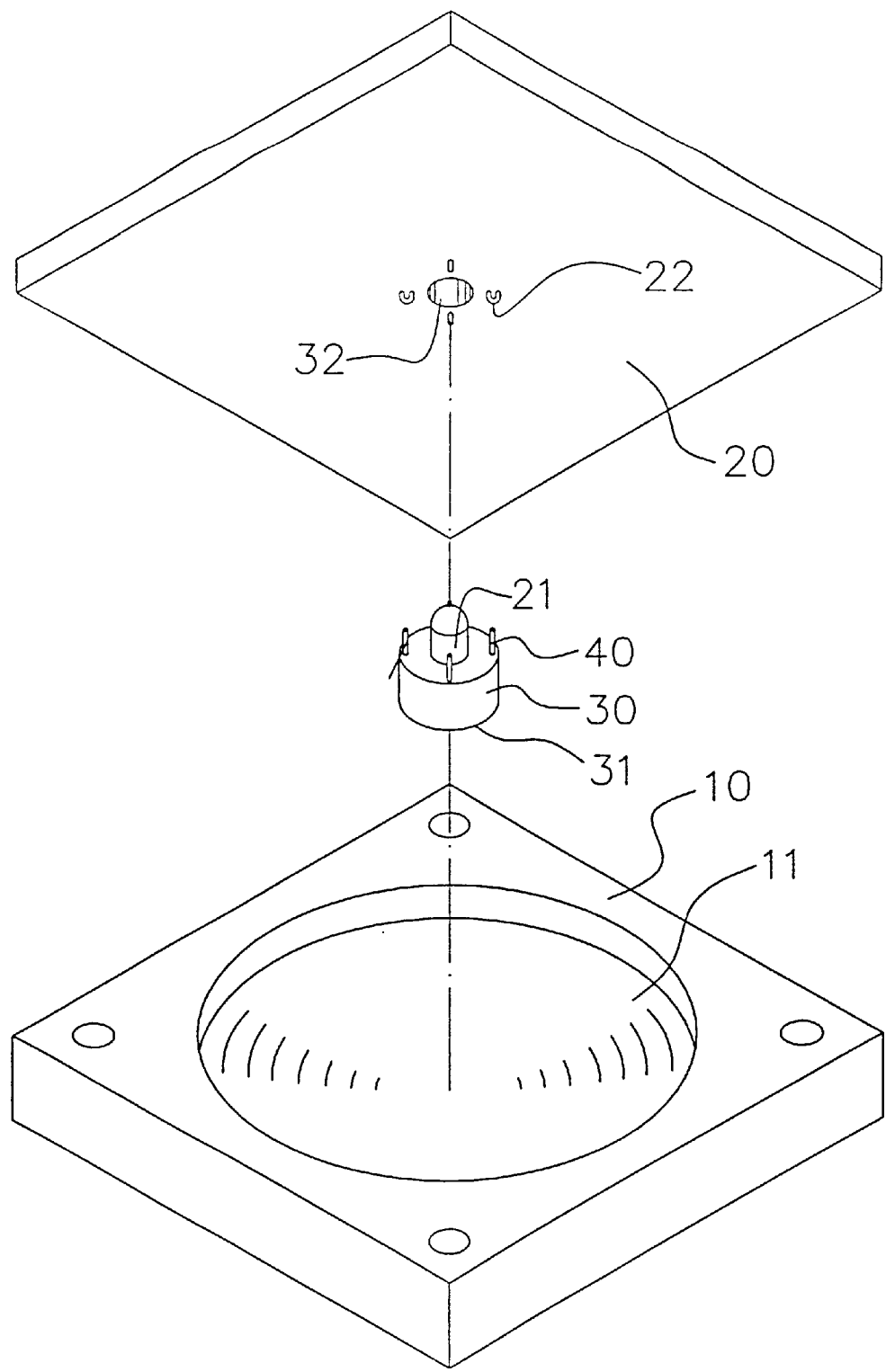
FIG. 11 is an exploded view of yet another construction according to the invention.

With reference to the drawings, the invention includes a base 10, a carrier seat 20, a slide block 30 and springs 40. The base 10 can be round, square, rectangular, elliptic or polygonal, and is secured to the ground surface by bolts or ground bolts. The center of the top side of the base 10 forms a round curved concave slide recess 11 in which is disposed the slide block 30. The slide block 30 has an area smaller than that of the slide recess 11, and has a bottom side forming a curved surface 31. The curved surface 31 and the concave surface of the slide recess 11 have equivalent diameter so that the bottom side of the slide block 30 can tightly abut against the surface of the slide recess 11 and can smoothly slide. The center of the top side of the slide block 30 is formed with a hemispherical depressed coupling groove 32 for coupling with the carrier seat 20. The carrier seat 20 is a plate member shaped like the base 10, and has an area sized to be equivalent, larger, or smaller than that of the base 10, and can be lockably secured and coupled with the bottom end of a column of a building. The center of the bottom side of the carrier seat 20 has a coupling post 21 projecting therefrom. The distal end of the coupling post 21 is formed with a hemispherical surface having a diameter equivalent to that of the coupling groove 32 such that it can be insertably disposed in the coupling groove 32 of the slide block 30. The surface of the slide block 30 around the coupling groove 32 is provided with a suitable number of equidistantly spaced apart springs 40 such that the bottom ends of the springs 40 hook on the top side and the flank side of the slide block 30, and the top ends thereof hooking on hook fasteners 22 on the bottom side of the carrier seat 20. Such a configuration enables the carrier seat 20 to swing on the slide block 30, and the springs 40 interposed therebetween enable the carrier seat 20 to generate a restoring and balancing force, which acts upon the slide block 30 so that components will not become disengaged when subjected to an elevating action. If damping devices or rubber-like materials are used in place of the springs 40, damping effects are additionally provided. In addition, as the slide recess 11 in the upper side of the base 10 is round and curved, the sliding operation of the slide block 30 accumulates potential energy so that the slide block 30 can smoothly return to its position after sliding displacement. The coupling groove 32 can be a cylindrical depressed hole with a hemispherical distal end to increase swinging effects for eliminating shocks. FIG. 8 shows another assembly in which the shape of the bottom end of the coupling post 21 is equivalent to the curved surface 31 of the slide block 30 in diameter. FIGS. 9 and 10 show yet another assembly in which the base 10 or carrier seat 20 can be coupled with a rubber supporting pad 70 to enhance shock eliminating and damping effects. The rubber supporting pad 70 is made of rubber-like materials, such as laminated-rubber bearing, lead-rubber bearing, etc. FIG. 11 shows still another assembly of the invention in which the coupling post 21 is located at the center of the top side of the slide block 30, and the coupling groove 32 is located at the center of the bottom side of the carrier seat 20. The hemispherical surface at the distal end of coupling post 21 is equivalent to the coupling groove 32 in diameter and is therefore tightly coupled, thereby achieving the same functions as the construction in FIG. 1 and ensuing the original mechanism and effects of the shock eliminator to ensure the safety of the building. Furthermore, the surfaces of the slide recess 11, the curved surface 31, the coupling groove 32 and the coupling post 21 are coated with durable lubricating materials to increase the efficiency of the shock eliminator. Since the structure of the invention is simple, it can be installed easily and can reduce costs considerably.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved shock eliminator, comprising a base, a carrier seat, a slide block and springs, said base having a top side centrally formed with a round curved concave slide recess, said slide block being disposed in said slide recess and having a bottom side formed with a curved surface which has a diameter equivalent to that of said slide recess, and a top side centrally formed with a hemispherical depressed coupling groove, said carrier seat being a plate member disposed on the top portion of said slide block and having a bottom side centrally formed with a coupling post having a hemispherical distal end with a diameter equivalent to that of said hemispherical depressed coupling groove for insertion into said coupling groove of said slide block, a suitable number of said springs being arranged on the top side and the flank side of said slide block around said coupling groove such that one end of said springs being connected to the top side and the flank side of said slide block while the other end is connected to the bottom side of said carrier seat.

2. The improved shock eliminator as claimed in claim 1, wherein said base and said carrier seat are configured to have similar or different shapes and can be round, rectangular, square, elliptical or polygonal.

3. The improved shock eliminator as claimed in claim 1 or 2, wherein said carrier seat has a surface area equivalent, smaller or larger than that of said base.

4. The improved shock eliminator as claimed in claim 1, wherein said slide block has a cross section that can be round, square, rectangular, elliptical or polygonal.

5. The improved shock eliminator as claimed in claim 1, wherein said springs can be devices providing a damping effect or rubber-like materials.

6. The improved shock eliminator as claimed in claim 1, wherein said base and said carrier seat can be directly and tightly coupled.

7. The improved shock eliminator as claimed in claim 1, wherein said coupling post is hemispherical.

8. The improved shock eliminator as claimed in claim 1, wherein said base can be coupled with a rubber supporting pad or spring.

9. The improved shock eliminator as claimed in claim 1, wherein said carrier seat can be coupled with a rubber supporting pad or spring.

10. The improved shock eliminator as claimed in claims 8 or 9, wherein said rubber supporting pad or spring can be a laminated-rubber bearing or lead-rubber bearing.

11. The improved shock eliminator as claimed in claim 1, wherein said base, said carrier seat and said slide block can be turned upside down.

12. The improved shock eliminator as claimed in claim 1, wherein positions of said coupling groove and said coupling post can be switched to have said coupling groove located at the center of the bottom side of said carrier seat and said coupling post located at the center of the top side of said slide block.

13. The improved shock eliminator as claimed in claim 1, wherein the surface of said slide recess is coated with durable lubricating materials.

14. The improved shock eliminator as claimed in claim 1, wherein the surface of said curved surface of said slide block is coated with durable lubricating materials.

15. The improved shock eliminator as claimed in claim 1, wherein the surface of said coupling groove is coated with durable lubricating materials.

16. The improved shock eliminator as claimed in claim 1, wherein the surface of said coupling post is coated with durable lubricating materials.

17. The improved shock eliminator as claimed in claim 1, wherein said coupling groove can be a cylindrical depressed hole with a hemispherical distal end.

* * * * *

UNITED STATES PATENT AND TRADEMARK OFFICE
CERTIFICATE OF CORRECTION

PATENT NO.      : 6,572,071 B1
DATED           : June 3, 2003
INVENTOR(S)     : Chong-Shien Tsai It is certified that error appears in the above-identified patent and that said Letters Patent is hereby corrected as shown below:

<u>Title page,</u>
Item [76], Inventor, delete the words "Chung-Shien Tsai" and insert the words
-- Chong-Shien Tsai --.

Signed and Sealed this

Thirtieth Day of March, 2004

JON W. DUDAS
*Acting Director of the United States Patent and Trademark Office*